(12) United States Patent
Becker et al.

(10) Patent No.: US 11,407,189 B2
(45) Date of Patent: Aug. 9, 2022

(54) ADDITIVELY-MANUFACTURED CORNER CUBE SUBSTRATE

(71) Applicant: MetrologyWorks, Inc., Buckner, MO (US)

(72) Inventors: Eric S. Becker, Spirit Lake, IA (US); Joel R. Gorden, Grain Valley, MO (US)

(73) Assignee: METROLOGYWORKS, INC., Buckner, MO (US)

( * ) Notice: Subject to any disclaimer, the term of this patent is extended or adjusted under 35 U.S.C. 154(b) by 465 days.

(21) Appl. No.: 16/439,332

(22) Filed: Jun. 12, 2019

(65) Prior Publication Data

US 2020/0391458 A1 Dec. 17, 2020

(51) Int. Cl.
| | |
|---|---|
| *B22F 10/20* | (2021.01) |
| *B33Y 80/00* | (2015.01) |
| *B33Y 10/00* | (2015.01) |
| *B29D 11/00* | (2006.01) |
| *G02B 5/122* | (2006.01) |

(52) U.S. Cl.
CPC ........ *B29D 11/00605* (2013.01); *B22F 10/20* (2021.01); *G02B 5/122* (2013.01); *B33Y 10/00* (2014.12); *B33Y 80/00* (2014.12)

(58) Field of Classification Search
CPC combination set(s) only.
See application file for complete search history.

(56) References Cited

U.S. PATENT DOCUMENTS

| | | | | |
|---|---|---|---|---|
| 2011/0128625 | A1* | 6/2011 | Larsen | H04B 10/00 359/530 |
| 2014/0376220 | A1* | 12/2014 | Shen | B29D 11/0074 362/339 |
| 2018/0180778 | A1* | 6/2018 | Pricone | B32B 15/18 |

* cited by examiner

*Primary Examiner* — Lawrence Averick
(74) *Attorney, Agent, or Firm* — Lathrop GPM LLP

(57) ABSTRACT

Techniques are disclosed to enable manufacture of open-air corner-cube retroreflectors having a corner-cube cavity. The techniques involve additively forming a substrate by way of additive manufacturing technologies such as three-dimensional printing technologies. The techniques further involve optionally machining the additively formed surface of the substrate and replicating a reflective surface in the corner-cube cavity using a master that is coated with a reflective material. An adhesive is applied to the corner-cube cavity so that when the adhesive cures and the master is withdrawn from the corner-cube cavity, the reflective surface adheres to the adhesive and remains an integral part of the retroreflector.

13 Claims, 5 Drawing Sheets

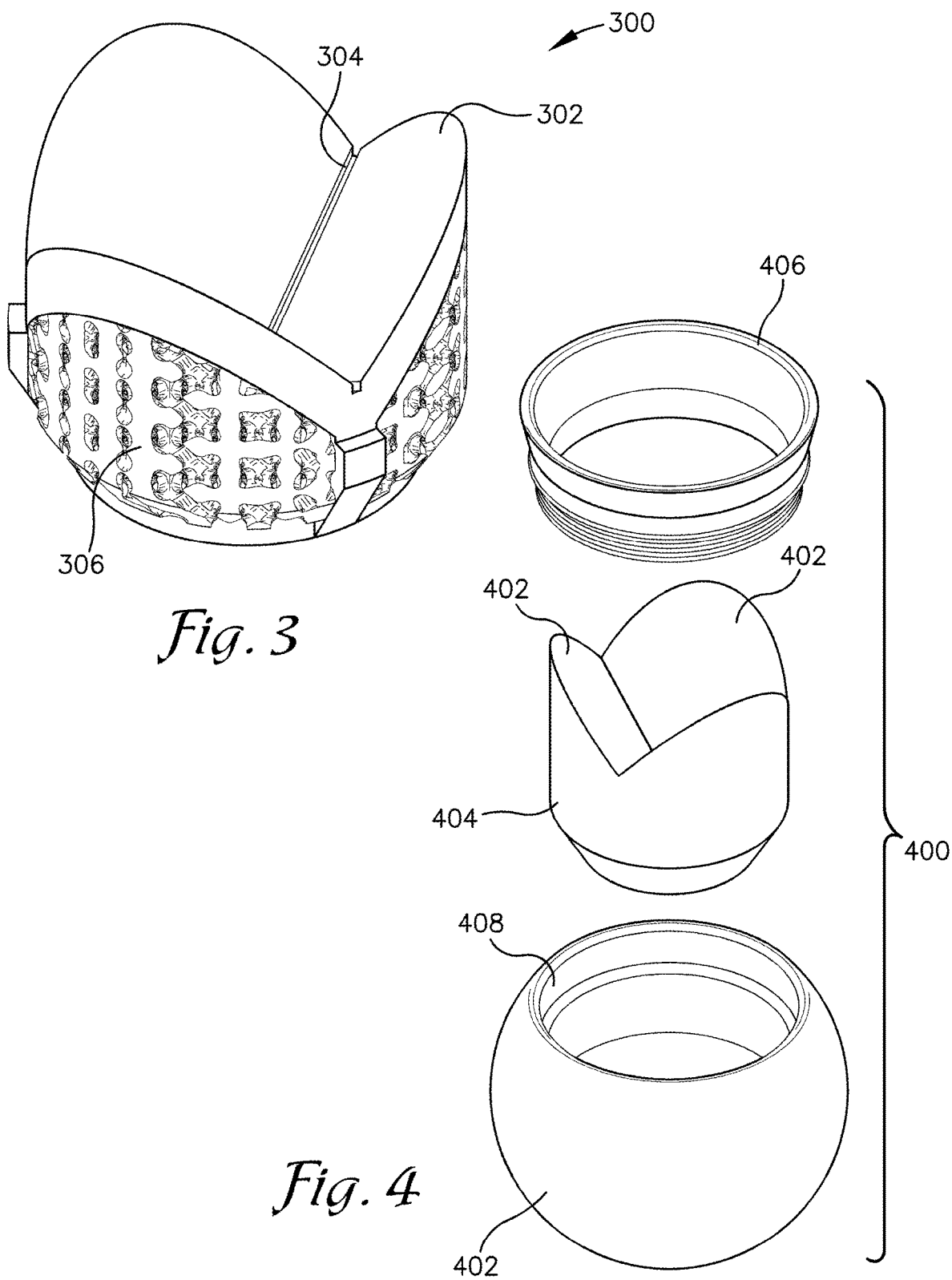

ADDITIVELY-MANUFACTURED CORNER CUBE SUBSTRATE

BACKGROUND

Corner-cube retroflectors are an important component in many modern precision measurement instrument systems. They can be used with surveying instruments, mounted on space satellites, integrated into the ball probe often referred to as spherically mounted retroreflector ("SMR") that laser trackers use to measure, and even can be used internally to instruments such as Fourier-transform infrared ("FTIR") spectrometers.

A corner cube retroreflector is unique in that it uses three flat surfaces to return a beam of light back to its source. The three surfaces must be 90 degrees to each other and will return the light back to the source in a parallel path to which it entered the reflector. There are two different types of corner cube retroreflectors. Solid corner cube retroreflectors where light must pass through the material of the reflector and hollow or open-air corner cubes where the light travels through air before bouncing off the reflecting surfaces. There are advantages to both versions. The solid reflectors are typically made of glass or similar and are one piece so they are very stable in a wide variety of applications and the three reflecting surfaces are protected from objects and dust that might scratch those surfaces. As the entry angle of the beam changes there needs to be compensation performed to maintain the same accuracy and repeatability. Accordingly, solid corner cube retroreflectors are not the preferred version for many industrial applications.

By contrast, hollow or open-air corner-cubes will return the light in a parallel path regardless of the entry angle of the light assuming it is not too close to parallel to any one of the three surfaces. Open air corner-cubes have been produced in a number of ways. The most common and economical has been an assembly that is comprised of three pieces of a glass substrate that has an optical coating applied to it. They are very stable and work very well in a wide variety of high and low temperature applications however they are fragile and will break if dropped.

The other conventional process used to produce open air corner cubes on a one-piece substrate is called replication. Replication uses a master that is coated with a reflective substance to be transferred to the substrate to form the desired reflective optical surface. The optical surface is then adhered into a receiving cavity in the substrate that closely matches the shape of the master. When the master is removed, the exterior surface of the substrate retains the reflective surface, i.e. it is separated from the master. A commonly used substrate is machined aluminum due to the fact that aluminum can be quickly and easily machined using conventional subtractive manufacturing processes such as milling or electrical discharge machining ("EDM").

Another common material for the substrate is stainless steel however the material in the corner cube pocket is typically removed via an EDM machining method due to the significant hardness of stainless steel, which makes it difficult to mill. The EDM process has a very slow rate of removal on stainless steel and typically increases the cost significantly which makes it infeasible for some applications due to the relatively higher cost. Nevertheless, stainless steel has a lower coefficient of thermal expansion compared to aluminum and for applications where the temperature varies it is therefore preferred. Nevertheless, its use has been restricted due to the above-mentioned high processing costs.

SUMMARY

The present teachings disclose open-air corner-cubes and methods for the manufacture of open-air corner-cube retroreflectors having a corner-cube cavity. The techniques involve additively forming a substrate by way of additive manufacturing technologies such as three-dimensional printing and 3D laser sintering. The present teachings further disclose optionally machining the additively formed surface of the substrate and replicating a reflective surface in the corner-cube cavity using a master that is coated with a reflective material. An adhesive is applied to the corner-cube cavity so that when the adhesive cures and the master is withdrawn from the corner-cube cavity, the reflective surface adheres to the adhesive and remains an integral part of the retroflector.

BRIEF DESCRIPTION OF THE DRAWINGS

The figures described below depict various aspects of the articles of manufacture disclosed herein. It is understood that these figures depict exemplary embodiments and particular aspects of the disclosed articles of manufacture. The exemplary features illustrated in the figures are intended to represent these aspects of the various disclosed embodiments and not intended to limit the claimed scope to any particular feature. Further, whenever possible, the following description refers to the reference numerals included in the figures, in which features depicted in multiple figures are designated with consistent reference numerals.

FIG. 3 is a perspective view of an additively-manufactured corner cube, having a regular, rectangular internal lattice structure;

FIG. 4 is an expanded view of a spherically mounted retroreflector using a corner-cube substrate consistent with the present teachings;

DETAILED DESCRIPTION

The following text sets forth a detailed description of numerous different embodiments. However, it is understood that the detailed description is to be construed as exemplary only and does not describe every possible embodiment since describing every possible embodiment would be impractical. In light of the teachings and disclosures herein, numerous alternative embodiments may be implemented.

Figure 1:
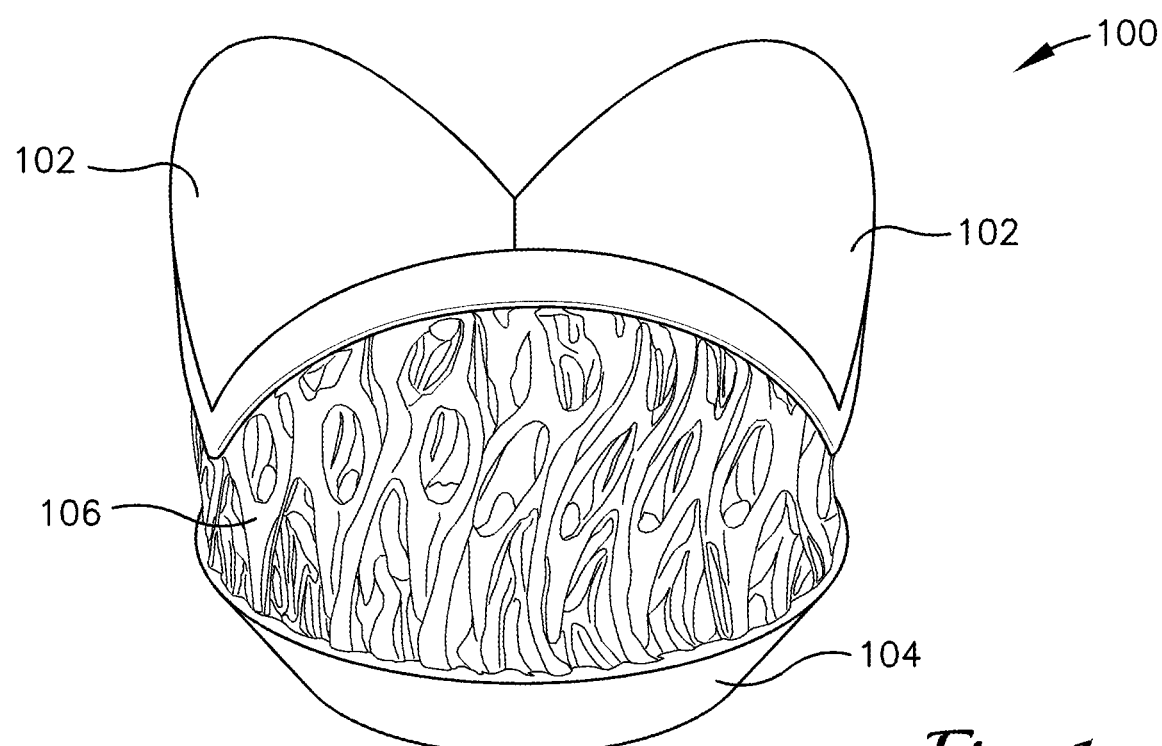
FIG. 1 is a perspective view of an additively-manufactured corner-cube retroreflector, having an organic internal structure.

FIG. 1 is a perspective view of an additively-manufactured corner cube having an organic internal support structure, consistent with the present teachings. In various embodiments, the substrate 100 is initially formed through an additive manufacturing process such as three-dimensional ("3D") printing. It is understood that this additive manufacturing process could involve any currently known or future developed manufacturing technology, included but not limited to: fused deposition modeling ("FDM"); stereolithography ("SLA"); digital light processing ("DLP"); selective laser sintering ("SLS"); selective laser melting ("SLM"); laminated object manufacturing ("LOM"); and digital beam melting ("DBM") or any other 3D printing technology.

In various embodiments, additive manufacturing techniques are employed to render a particular substrate to a near-net shape with flexible tolerances where exact geometries are not required and machining allowances are provided so that areas to be machined have extra material that can be removed by the machining process. In various embodiments, as much as 30% additional material is added to the design net-shape of the substrate. In alternative embodiments, for particular features of the substrate, a more precise net-shape is produced to reduce or eliminate the need for subsequent processing.

In various embodiments, the material for the substrate is chosen to be non-metalic such as plastics and ceramics. In alternative embodiments metal and metal alloy substrates are chosen. In various embodiments, the following metals are employed for the substrate, aluminum, stainless steel, steel, titanium, cobalt chrome, Inconel, nickel, invar, and tungsten, this also includes metal alloys that include these base metals. For some applications it is necessary to machine critical mounting surfaces in a mill or lathe, however this part is optional, sometimes not necessary as some additive manufacturing machines are accurate to 0.001 inches or even higher precision.

In various embodiments, after the substrate is formed, the substrate is further processed by machining it using electrical discharge machining ("EDM"). It is understood that this can be wire EDM, sinker EDM, or small-hole EDM. In various embodiments, the corner-cube cavity is machined with EDM only enough to clean up the surface. It is understood that minimal processing saves time and money in that the process only has to clean up and remove a small amount of material from the surface of the corner-cube cavity.

In various embodiments, the corner-cube cavity of the substrate is sufficiently flat and perpendicular so that the adhesive can be applied directly to petals 102 which form the corner-cube cavity, without an additional machine processing step. In various embodiments, the substrate is printed with flat enough surfaces that each of the three petals 102 are all 90 degrees to each other within or under 5-10 arcseconds. In this case, the further processing step, e.g. EDM is unnecessary.

Given a substrate 100 with a substantially flat and perpendicular corner-cube cavity, an optically reflective surface can be replicated onto the corner-cube cavity using a master and epoxy replication so the substrate inherits the master's geometrical properties and thereby forms a retroreflector. In various embodiments the petals of the corner-cube cavity are perpendicular within +/− 0.060 degrees of perpendicularity.

In various embodiments, the substrate 100 is printed solid (not shown in FIG. 1) so that the organic structure 106 as shown in FIG. 1 is completely in-filled. In various embodiments, however, the organic interior 106 is printed with cavities as shown in so as to reduce the amount of material used in printing the substrate 100 and thereby save costs associated with the material and to make the substrate lighter. In various embodiments, the organic structure is selected so that thermal expansion of the substrate is substantially uniform that that if the substrate 100 expands or contracts under a variety of environmental factors, such as temperature, the contraction and expansion does not result in a deformation of the substrate 100. In various embodiments a base 104 of the substrate 100 is chamfered so that it can be affixed to and centered within the interior of a substantially spherical ball probe, such as a spherically-mounted retroreflector (as further explained below in connection with FIG. 4). In various embodiments the base 104 is not chamfered and it can be threaded or otherwise adapted to be mounted for various applications as will be further explained below.

Figure 2:
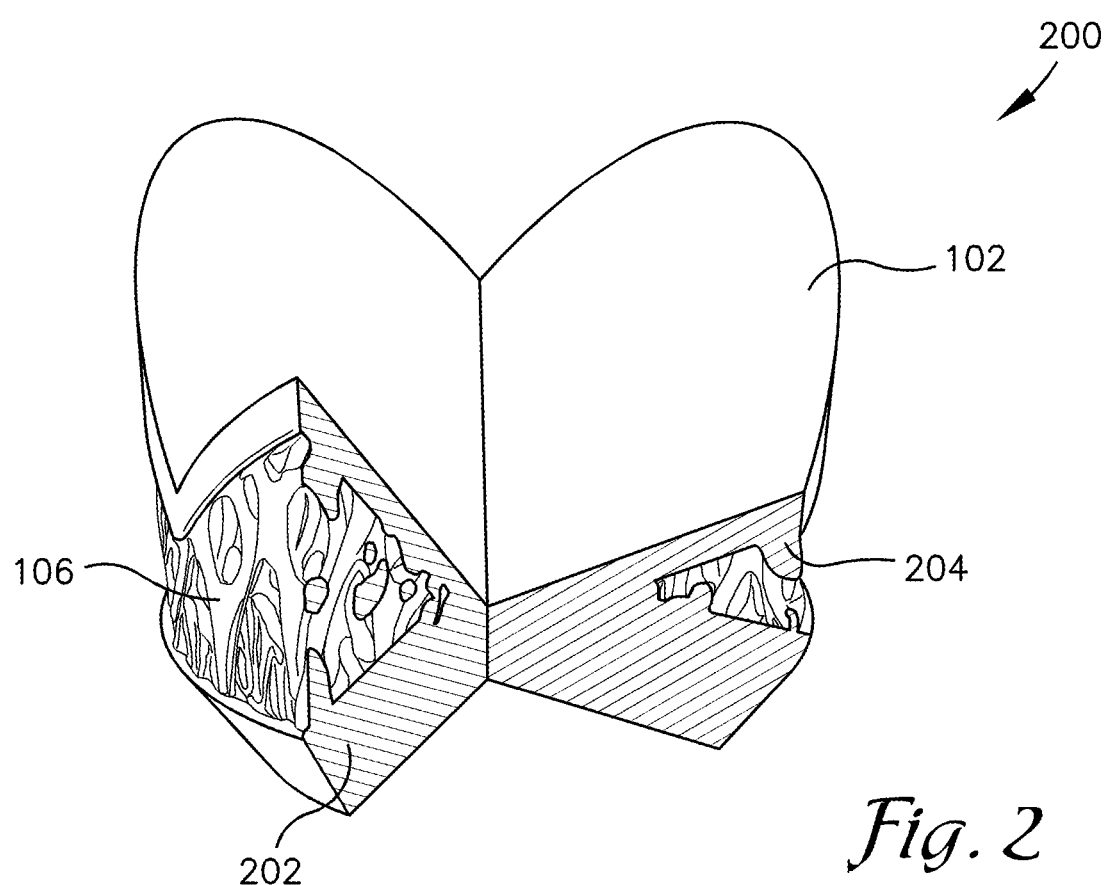
FIG. 2 is a cross-sectioned perspective view of an additively-manufactured corner-cube retroreflector having an organic internal structure.

FIG. 2 is a cross-sectioned perspective view of an additively-manufactured corner-cube retroreflector having an organic internal structure. The substrate 200 us shown in cross-section so that the bounds of the internal organic structure 106 can be observed. FIG. 2 shows that the additive manufacturing process involves forming a solid layer 204 for each petal 102. Similarly, the solid layer 202 formed below the organic interior structure 106. As explained in connection with FIG. 1, in various embodiments, the organic layer 106 is completely filled-in such that the solid layer 204 would extend throughout the interior portion of the substrate 200 so that the substrate 200 is substantially solid. FIG. 2 illustrates the various embodiments that have a partially hollow interior (here organic interior 106) to provide a lighter-weight substrate and one that deforms less when thermally contracting or expanding.

FIG. 3 is a perspective view of an additively-manufactured corner cube, having a regular, rectangular internal lattice structure. The regular, rectangular internal lattice structure 306 can be formed by way of additive manufacturing techniques, and as set forth above has the benefit of resulting in a lighter weight substrate 300. In various embodiments petals 302 are formed with an additional undercut 304 that is economical to 3D print but difficult to mechanically mill. In various embodiments, the undercuts 304 are formed between each of the three perpendicular petals 302. In this way, there is not a sharp apex in the substrate 300, however, through the replication process, a sharp corner between the petals 302 can be formed using the adhesive and reflective coating. In essence, the sharpness of the corner associated with the undercuts 304 will be determined by the sharpness of the edge of the master that is used.

FIG. 4 is an expanded view of a spherically mounted retroreflector ("SMR") using a corner-cube substrate consistent with the present teachings. In various embodiments, the retroreflectors disclosed in connection with the present teachings are used in SMR applications. As shown in FIG. 4, corner-cube retroreflector 404 can be fitted into a substantially spherical ball probe 402 such that the apex of the petals 402 is very accurately centered within the ball probe 402. The corner cube retroreflector 404 is adhered into the ball 408 using epoxy or some other type of adhesive. In various embodiments, the ring 406 is threaded into the ball probe 402 at threaded area 408. The ring 406 can be used to attach a lanyard to the SMR and generally to facilitate handling and use of the associated SMR.

Figure 5:
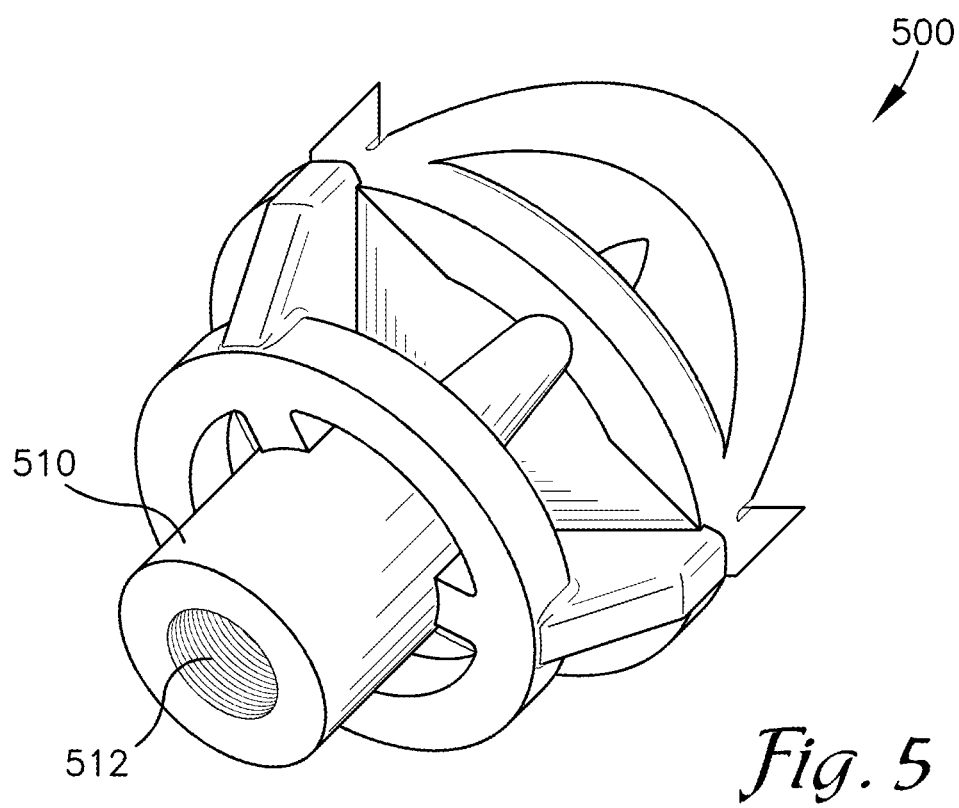
FIG. 5 is a perspective view of an additively-manufactured corner cube, retroreflector, including an internally-threaded stud.

FIG. 5 is a perspective view of an additively-manufactured corner cube retroreflector, including an internally-threaded stud. In this embodiment, a uniform, additively-manufactured substrate 500 is produced that has, to the extent practicable, a substantially constant cross-section. In this way, and as an alternative to a hollow or hollow-latticed substrate, a light-weight substrate is provided as well as one that can thermally expand and/or contract without substantial deformation. In this embodiment a stud 510 is provided that has an optional threaded area 512. In various embodiments, a retroreflector produced from the substrate 500 can be threaded onto a fixture, in a machine such as a spectrometer or otherwise attached to a device, such as a space satellite. In various embodiments, measurements need to be repeatable to determine whether a piece being measured has experienced movement. Such retroreflectors are sometimes called "repeatability targets". In various embodiments, retroreflectors formed from the substrate 500 are used as such repeatability targets.

Figure 6:
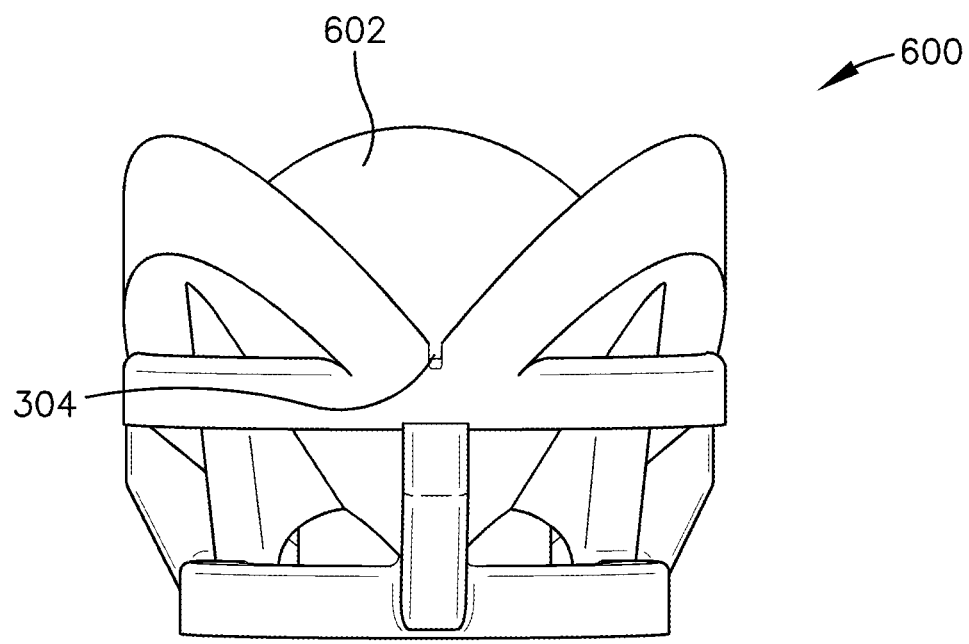
FIG. 6 is a perspective view of an additively-manufactured corner cube retroreflector.
Figure 7:
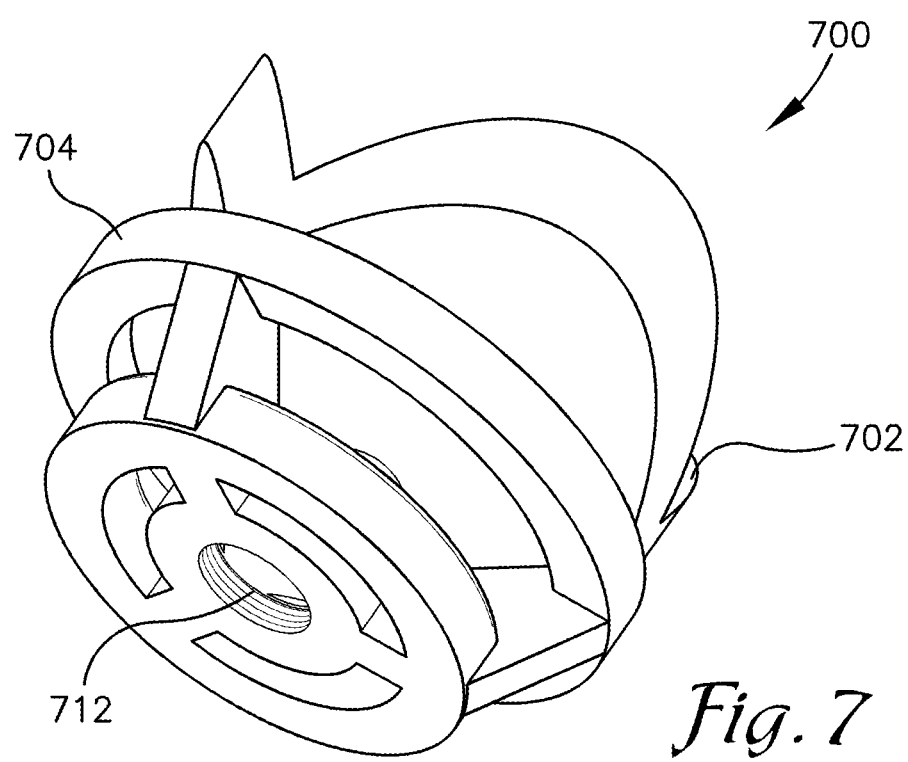
FIG. 7 is a perspective view of an additively-manufactured retroreflector.

FIGS. 6 and 7 are perspective views of an additively-manufactured corner cube retroreflector with substantially constant cross-sectional supports as described above in connection with FIG. 5. The substrate 600 of FIG. 6 lacks the stud of substrate 500 in FIG. 5 but is otherwise substantially similar in configuration. It is understood that the petals 602 are formed to be perpendicular to each other. Undercut 304 is provided in a fashion similar to that explained in connection with the undercuts 304 of FIG. 3. Similarly, the substrate 700 of FIG. 7 has petals 702 that are perpendicular to each other and each of the supports making up the structure of the substrate 700 are of similar width to provide a substrate having a substantially constant cross-section. Substrate 700 includes several cavity areas between the outer support ring 704 and the constant cross section of the optical surface main body that are only possible to create using additive manufacturing. These interior voids could not be machined using a conventional mill or lathe. In various embodiments, the threaded area 712 is provided to thread retroreflectors formed with the substrate 700 onto various platforms to be used in connection with the retroreflectors of the present teachings.

Figure 8:
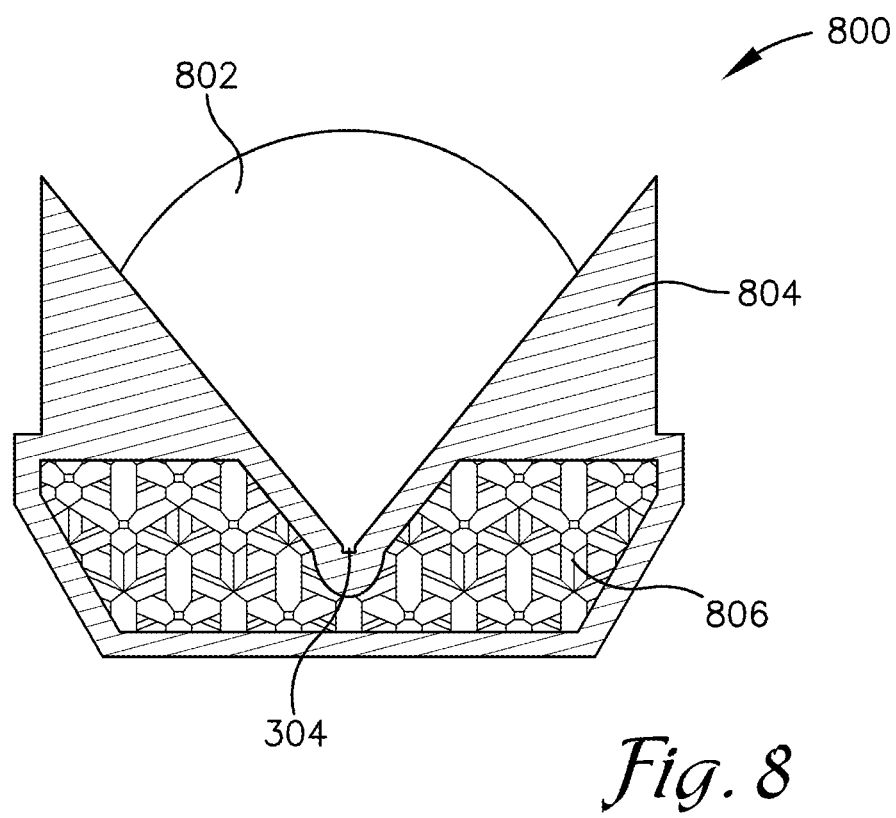
FIG. 8 is a cross-sectioned perspective view of an additively-manufactured retroreflector having a partially hollow interior with a triangular internal lattice structure.

FIG. 8 is a cross-sectioned perspective view of an additively-manufactured retroreflector having a partially hollow interior with a triangular internal lattice structure 806. The substrate 800 of FIG. 8 is sectioned so as to expose a solid portion 804 that is formed through the additive manufacturing process. The cutout 304 (as described in connection with FIGS. 3 and 6) can also be observed. In this embodiment, in order to provide a more rigid structure, a triangular-lattice structure is provided in only part of the substrate 800. Petals 802 are substantially perpendicular to each other to provide a substrate for producing a retroreflector by way of replication.

Figure 9:
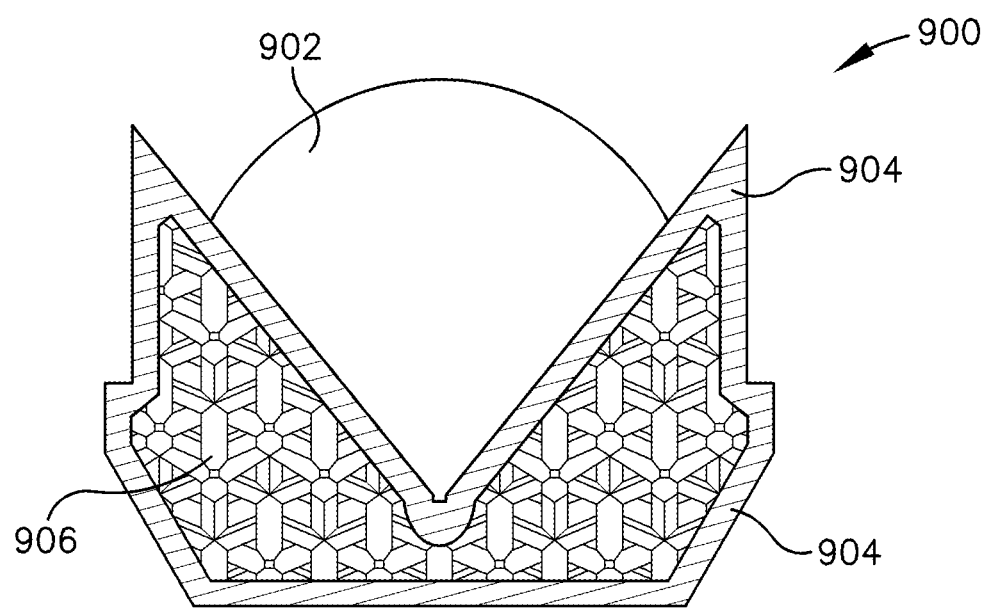
FIG. 9 is a cross-sectioned perspective view of an additively-manufactured corner cube having a substantially hollow interior with a triangular internal lattice structure.

FIG. 9 is a cross-sectioned perspective view of an additively-manufactured corner cube having a substantially hollow interior with a triangular internal lattice structure. By contrast to the substrate 800 of FIG. 8, the substrate 900 of FIG. 9 is shown with triangular internal lattice structure 906 that extends up and throughout the interior of the petals 902 of the substrate 900. In this way, the solid portion 904 is substantially thinner than the solid portion 804 of FIG. 8. Accordingly, the substrate 900 will be lighter than the substrate 800 but will exhibit a correspondingly lessened rigidity.

Figure 10:
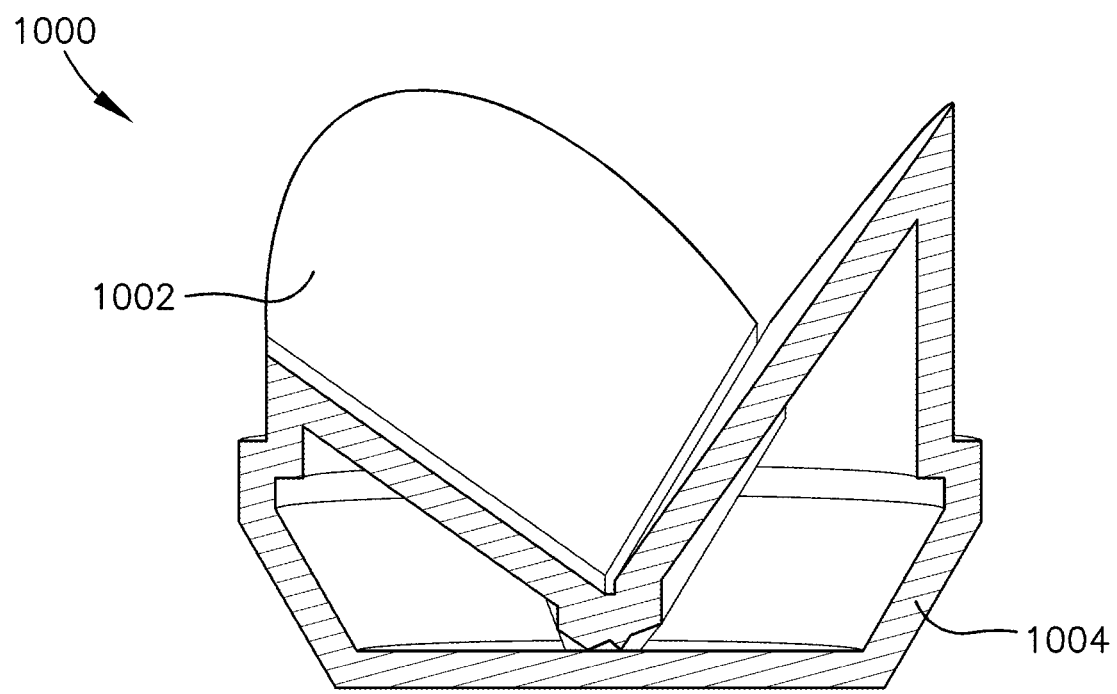
FIG. 10 is a cross-sectioned perspective view of an additively-manufactured corner cube having a hollow interior with a hollow internal structure.

Finally, FIG. 10 is a cross-sectioned perspective view of an additively-manufactured corner cube having an hollow interior with a hollow internal structure. As shown in connection with the substrate 1000 of FIG. 10, it is possible using three-dimensional printing to print the substrate 1000 with a hollow interior. The solid portion 1004 provides an outer surface to support the petals 1002 while being extremely light-weight and having no internal lattice structure whatsoever.

Due to the use of machining methods including milling and EDM the raw materials for machined corner cube substrates are often bar stock or in particular applications solid balls. It takes a considerable amount of time and money to remove the necessary material to make a corner cube capable of being used in an optical assembly. The removal of the extra material is inefficient and wasteful. In designing an open air corner cube for use as part of a ranging system or in an optical assembly the three planes arranged at 90 degrees to each other are required for the beam of light to be returned in a parallel path. The other feature that is often necessary is a way to mount the part for use on a part or inside an optical instrument. One specific type of optical assembly is a spherically mounted retroreflector that is used in conjunction with a laser tracker head. In this case the optic is centered into a high precision ball (as described above in connection with FIG. 4) so that measurements can be made, the collection software then offsets for the radius of the ball to compensate the measurement. The present teachings present advantages over such substrates produced for corner cube reflectors have been made from solid balls or billet materials. Thermal properties are a concern in any reflector, especially in the case of solid-aluminum substrates. It is understood that over large temperature fluctuations the shape of the optical surfaces of solid aluminum substrates has warped and changed enough to render a reflector unusable due in large part to the growth or shrinkage of larger volumes of material because of thermal expansion.

Accordingly, the present teachings have a distinct advantage over machined solid aluminum substrates. As set forth above, the disclosed additive manufacturing methods, including 3D laser sintering and other 3D printing processes, which selectively solidify and add material in layers, provides a means to create a near net shape that only needs minimal processing via mechanical processes (mill, lathe) for the mounting geometry and optional EDM processing if necessary to create a usable surface that can be used for replication. The present teachings have the additional benefit of reducing the cost of machining a harder material also having a lower CTE like steel, stainless steel, titanium, Inconel, cobalt chrome, invar, and similar alloys into a corner cube substrate down into a range that is practical for use in both instruments and optical assemblies. Further benefits of using additive manufacturing to produce substrates involve the ability to design substrates that are hollow or otherwise having a geometry that would not be possible to make using subtractive manufacturing alone. The present teachings provide the ability to design a substrate that is a shell with a specified thickness that is then filled with a lower density structure (or none at all, see. FIG. 10) thereby providing sufficient support to the surrounding surfaces yet being lightweight.

Software products such as Materialise Magics can be utilized to take a Solid CAD Model and created the shell thickness and ordered internal lattice structure or a software like AutoDesk Within or Fusion 360 can be utilized to create more organic freeform lattice structures as well as Autodesk Shape Generator that uses a generative design workflow where the user inputs some constraints on the part and then software does an analysis and shows the operator all the areas that are critical and those that are not stressed and can be removed. This design allows for a lighter weight end part therefore enabling more of these types of parts to be used in critical military and space applications as one example where weight is a concern.

Such design approaches also help create a part that has more material in critical areas and still has adequate support in the less critical volume to ensure structural integrity of the part. Another benefit of thinning out the amount of material in the larger base volume of the reflector is that it will make the overall part more thermally stable by creating a material thickness closer to that of a constant cross section which will also make it more dimensionally stable at larger temperature gradients. The less material there is in these supporting areas that must shrink or grow the less stress and force it will apply to the surrounding critical areas. An alternate version of this would be to make the critical areas solid and then have auxiliary support areas that are made up of an ordered or organic lattice or support ribs. This design truly allows for the least amount of material to be used. Additive manufacturing the substrate also gives you the ability to add features that do not need to be machined and either very difficult or impossible to add previously. An example of this type of feature includes an optional very small undercut, such as undercut 304 as shown above in connection with FIGS. 3 and 6, to relieve the intersections of the corner cube. One of the areas that wear the fastest on any EDM electrode is the sharp edge and tip that are used to create the sharp corner needed for the master to fully seat down in the corner cube. In under cutting this area we remove the possibility of breaking the sharp edge on the electrode. This allows for less down time and less maintenance on the electrode which reduces production costs.

Similarly, with respect to replication, a sharp corner in the corner-cube cavity of a particular substrate is also problematic for the master as it also has a sharp edge, necessitating costly EDM processing to ensure that the radius in the corner of the corner-cube substrate is sufficiently small to accommodate the sharp edge of the master. Now the sharp corner in the substrate is relieved and neither the EDM nor master has the requirement of pushing a sharp edges against a similarly sharp corner of the substrate. In the replication process, adhesive will fill the gap in the undercut 304 still-providing a sufficiently sharp corner with the optical surface transferred from the master.

Although the foregoing text sets forth a detailed description of numerous different embodiments, it is understood that the detailed description is to be construed as exemplary only and does not describe every possible embodiment because describing every possible embodiment would be impractical, if not impossible. In light of the foregoing text, numerous alternative embodiments may be implemented, using either current technology or technology developed after the filing date of this patent application.

What is claimed is:

1. A method of manufacturing an open-air corner-cube retroreflector having a corner-cube cavity, the method comprising:
   additively forming a substrate by way of additive manufacturing technology; and
   replicating a reflective surface in the corner-cube cavity using a master that is coated with a reflective material, wherein an adhesive is applied to the corner-cube cavity so that when the adhesive cures and the master is withdrawn from the corner-cube cavity, the reflective surface adheres to the adhesive and thereby remains in the corner-cube cavity.

2. The method of claim 1, further comprising:
   machining the additively formed surface of the substrate so that petals associated with the substrate are substantially perpendicular to each other.

3. The method of claim 2, wherein the substrate has a substantially constant cross-section.

4. The method of claim 3, wherein the substrate further comprises an outer support ring and several cavity areas between the outer support ring and the constant cross section of the corner cube cavity.

5. The method of claim 4, further comprising forming a stud in the substrate opposite the corner cube cavity.

6. The method of claim 5, further comprising machining threads on the stud.

7. The method of claim 2, wherein the machining step is performed using mechanical milling.

8. The method of claim 2, wherein the machining step is performed using electrical discharge machining.

9. The method of claim 1, wherein the reflective material comprises gold.

10. The method of claim 1, wherein the reflective material comprises aluminum.

11. The method of claim 1, wherein the adhesive comprises epoxy.

12. The method of claim 1, wherein the additive manufacturing technology is direct metal laser sintering.

13. The method of claim 1, wherein the additive manufacturing technology is electron beam laser melting.

* * * * *